F. DE ANGELIS.
COOKING RANGE.
APPLICATION FILED JUNE 25, 1909.
1,072,097.
Patented Sept. 2, 1913.
2 SHEETS—SHEET 1.
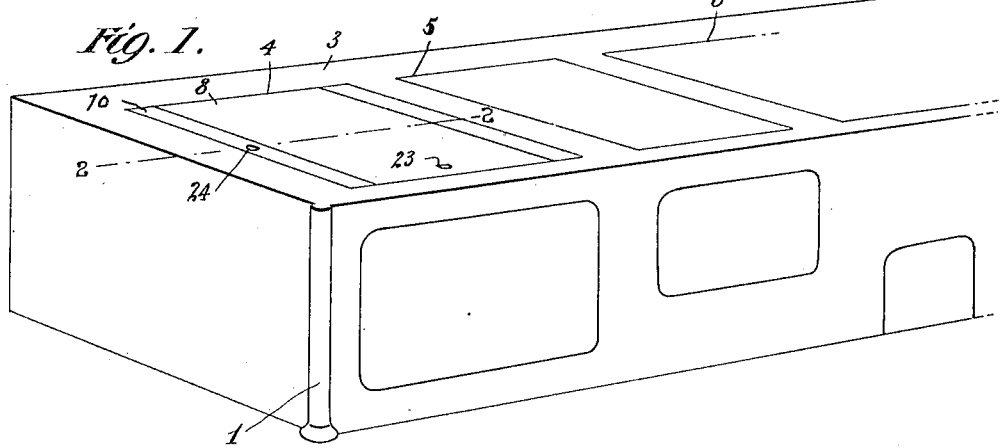
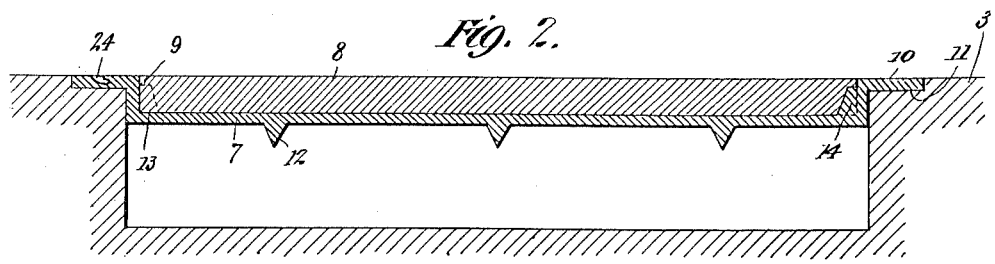
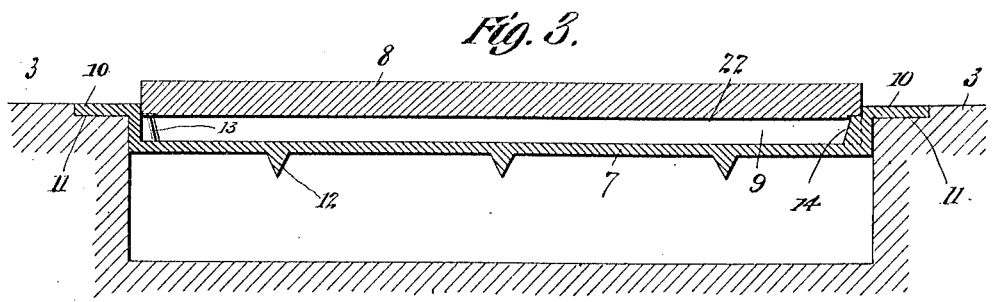
Witnesses:
Inventor
Frank de Angelis.
By his Attorney

F. DE ANGELIS.
COOKING RANGE.
APPLICATION FILED JUNE 25, 1909.

1,072,097.

Patented Sept. 2, 1913.
2 SHEETS—SHEET 2.

UNITED STATES PATENT OFFICE.

FRANK DE ANGELIS, OF NEW YORK, N. Y.

COOKING-RANGE.

1,072,097. Specification of Letters Patent. Patented Sept. 2, 1913.

Application filed June 25, 1909. Serial No. 504,351.

*To all whom it may concern:*

Be it known that I, FRANK DE ANGELIS, a subject of the Emperor of Austria-Hungary, residing in the borough of Manhattan, New York city, county and State of New York, have invented certain new and useful Improvements in Cooking-Ranges, of which the following is such a full, clear, and exact description as will enable any one skilled in the art to which it appertains to make and use the same, reference being had to the accompanying drawings, forming part of this specification.

My invention relates to improvements in cooking ranges and has special reference to the top thereof on which the cooking is done and the invention consists in the novel arrangements and combinations of the several parts of the device all as hereinafter fully described and then pointed out in the claims.

I have illustrated types of my invention in the accompanying drawings, wherein:—

Figure 4:
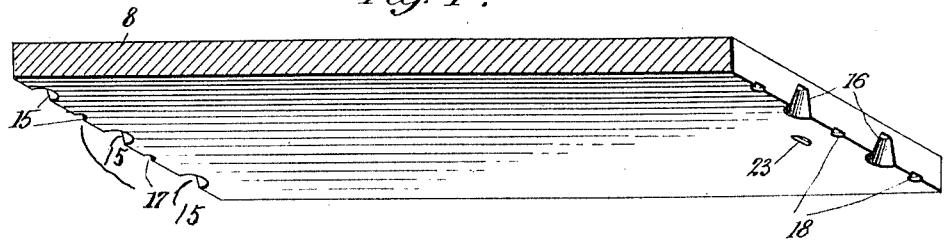
Figure 5:
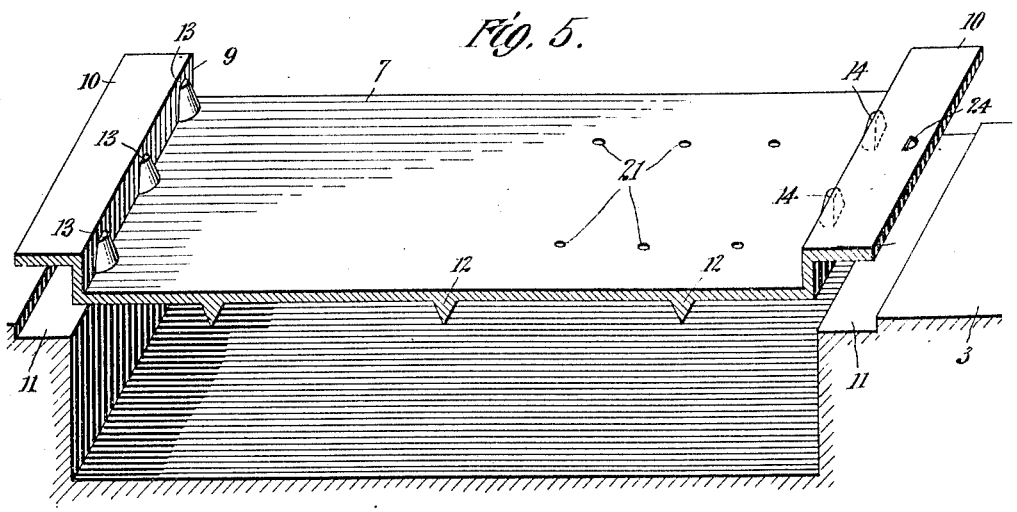
Figure 6:
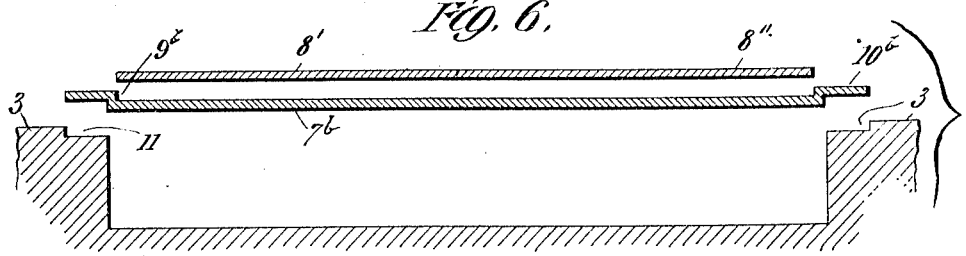
Figure 7:
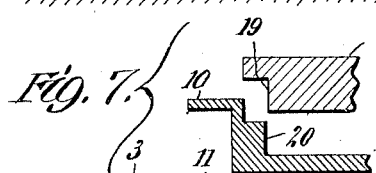
Figure 8:
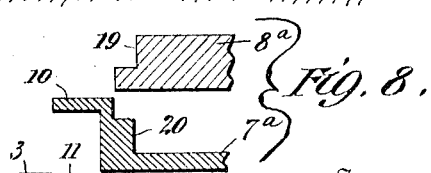

Figure 1 shows, in perspective, part of a well-known form of cooking range having applied to the top, at the end thereof, my improvements. This view is shown on a reduced scale compared with the remaining views. Fig. 2 is a vertical section of the under or main plate and the superposed cover plate nested therein in accordance with my invention, the plane of the section being indicated on line 2, 2, Fig. 1. Fig. 3 is a similar view to that shown in Fig. 2, but with the cover plate raised slightly away from the main plate and supported in that position. Fig. 4 is a perspective view of the cover plate detached and shows the two sets of different sized sockets formed in the opposite ends of said plate. Fig. 5 is a perspective view of the under or main plate together with part of the top of the range, the plate being shown as being dropped into position in the top of the range above the heating or fire-chamber. Fig. 6 is a vertical sectional view of part of the top of the range together with the under plate and the cover plate, showing the manner in which they are assembled and the cover plate being in two sections instead of one. Figs. 7 and 8 show details of the joints between the edges of the cover and under plate, respectively, likewise the top of the range, the parts being spaced and showing the manner in which they are put together.

Referring to the drawings in which like numbers of reference designate like parts throughout, 1 is a cooking range, the top 3 of which is provided with several rectangular shaped openings 4, 5 and 6, which lead to the heating or fire-chamber beneath. The opening 4 in the top of the range at the end is shown as being provided with my improved cover comprising an under or main plate 7 and a superposed cover or upper plate 8. The under plate 7 has one side thereof formed with a comparatively deep recess 9 and the opposite ends of the plate are provided with flanges 10, which fit recesses 11 formed in the top 3 of the range at the opposite sides of the opening 4. In order to strengthen the main plate, it may be provided upon the side opposite to that where it is recessed, with strengthening ribs 12.

The under plate at opposite ends is provided within the recess 9 with a set of projections 13 and 14, respectively. These projections are inclined or tapered upwardly and are located at the side of the recess as shown, there being three of the projections 13 at one end while there are only two of the projections 14 at the other. The cover plate 8 has the opposite ends thereof provided with a set of large sized sockets or cavities 15, 16, respectively, and also a small sized set of sockets 17 and 18, respectively. The large sized sockets 15 are three in number while the smaller sockets 17, at the same end of the plate, are two in number, while at the other end of the plate the large sockets 16 are two in number while the smaller sized ones 18 are three in number. The object of this construction is to provide means whereby the cover plate may be completely nested in the recess of the under plate, as shown in Figs. 1 and 2, by adjusting the cover plate so that the three large projections 13 register with the large sockets 15, likewise the large sockets 16 with the projections 14, or it may be spaced quite a distance above the under plate when placed in the recess, by turning the cover plate end for end and letting the set of small sockets 18 engage the three projections 13, and the small sockets 17 engage the two projections 14, as shown in Fig. 3. Again, the cover plate and under plate may be constructed so as to space them or not, as desired, by means of the construction shown in Figs. 7 and 8, wherein the cover plate 8$^a$ has its opposite ends rabbeted at 19, and the under plate 7ᵃ is provided at the corresponding ends with a shoulder 20. By this means, when the cover plate is turned so that the rabbeted end is down, as indicated in Fig. 7, the two plates may be put together with no interspace, while if the plate is turned upside down so that the rabbet 19 lies upwardly, as shown in Fig. 8, the two plates when put together will be spaced from each other. The under plate 7 may also be provided with drain-holes 21 permitting the grease to pass from the upper surface of the plate down through the same, as shown in Fig. 5, and in some cases the cover plate may be made in two parts, as shown in Fig. 6, where the two sections 8' and 8'' fill the recess 9ᵇ in the under plate 7ᵇ which is formed on its upper surface with the recess 9ᵇ and is provided at its ends with flanges 10ᵇ, and is made without the strengthening ribs as shown in the other figures.

From the foregoing description it will be readily understood that cooking may be done upon the surface of the cover 8 either when the plate is completely nested in the under plate, as shown in Figs. 1 and 2, in which case the heat from beneath will be very high and direct as the two plates are in contact, though they present considerable thickness of material, or with the cover plate 8 raised slightly away from the under plate 7 and maintained in such position with an air-space 22 between the two plates, as indicated in Fig. 3. This adjustment is made by raising the cover plate from the position shown in Fig. 2 and reversing it end for end, so that the small sockets at the ends engage the projections 13 and 14, instead of the large sockets, thereby permitting the cover plate to enter the recess 9 of the under plate but a slight distance instead of filling it completely. With this adjustment, the interposed layer of air in the space 22 will, of course, modify the heat for cooking, and this adjustment is to be used when certain kinds of things are to be cooked and a more moderate heat is required. The highest heat can, of course, be obtained by removing the cover plate 8 and cooking directly upon the upper surface of the under plate 7, and this is done where a particularly high heat is required.

It will be particularly noted that the under plate 7 provides a smooth level surface which may be utilized by removing the cover plate, and that the cover plate itself provides two smooth and level surfaces, either of which may be used to cook upon, as hereinbefore described. This feature of providing additional surfaces upon which cooking may be done is an important advantage in this improvement. If, for instance, the apparatus is being used with the cover plate nested in the under plate, as shown in Figs. 1, 2 and 3, and a more highly heated cooking surface is desired, this may be readily obtained by merely lifting out the cover plate and leaving the surface of the under plate exposed for the cooking process. Again, if a certain kind of cooking is being done upon the cover plate and it is desired to then immediately have another and perhaps cleaner surface upon which to do other kind of cooking, this may be readily obtained by turning over the cover plate and using its underside, or by using the surface of the under plate itself. Of course, the apparatus may be used for any and all kinds of cooking for which it is adapted, it being readily used as a griddle or a frying or broiling device and in this way the expense and trouble of having different appliances to accomplish the cooking are avoided. Moreover, the apparatus can be applied to any ordinary range and it greatly increases the cooking capacity of the range, for the reason, as above stated, that as soon as one kind of cooking has been done on one of the surfaces of the cover plate, and the same is thereby rendered unfit for other kind of cooking, the cover may be merely inverted and a fresh, clean surface obtained, and which surface is equally as hot as the one for which it is substituted.

In order to readily lift the cover plate 8 from its recess in the under plate, the cover plate is provided with a small socket 23 upon each surface thereof. An ordinary stove-lid lifter may be applied to this socket 23 to raise this cover when desired. In the same way the flange 10 of the under plate 7 may be provided with a socket 24.

Various modifications may be made in the details of the different parts of the apparatus, without, however, departing from the spirit of my invention.

Having thus described my invention what I claim and desire to secure by Letters Patent is:—

1. A cooking range having the top thereof provided with a recessed under or main plate, and a removable cover plate adapted to be placed in said recess and when disposed with one side up to lie practically with its under surface in contact with the upper surface of said main plate and when disposed with the other side up to have its under surface spaced from the upper surface of said main plate and thereby provide an air space between said plates.

2. A cooking range having the top thereof provided with an under or main plate, a set of upwardly inclined or tapering projections arranged upon said under plate at suitable points thereon, a detachable cover plate having corresponding points thereon provided with two sets of sockets or cavities one set being substantially the size of said projections on the under plate and the other set being smaller, whereby when the cover plate is placed with its larger sockets over said projections the two plates are substantially in contact, but when the cover plate is placed with the set of smaller sockets over the projections of the under plate the two plates are spaced from each other.

In testimony whereof, I have hereunto set my hand in the presence of the two subscribing witnesses.

FRANK DE ANGELIS.

Witnesses:
WILLIS FOWLER,
CHARLES A. PRUCKNER.

Copies of this patent may be obtained for five cents each, by addressing the "Commissioner of Patents, Washington, D. C."